United States Patent Office 2,790,354
Patented Apr. 30, 1957

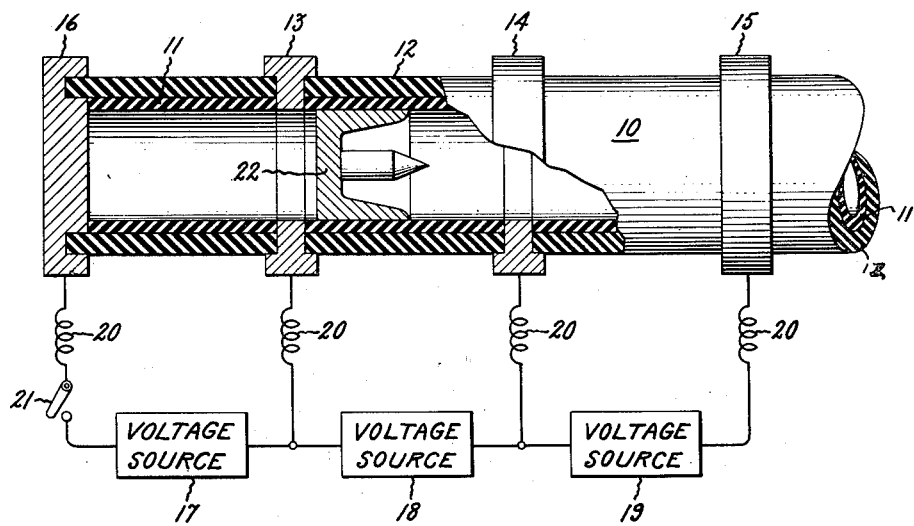

2,790,354

MASS ACCELERATOR

Yusuf A. Yoler, Schenectady, and James D. Cobine, Rexford, N. Y., assignors to General Electric Company, a corporation of New York Application April 20, 1956, Serial No. 579,682

8 Claims. (Cl. 89—8)

This invention generally relates to improvements in means for generating and applying electrical energy to propagate a mass down the length of an enclosure at great speed.

In a prior application of Yusuf A. Yoler, Serial No. 570,001 filed March 7, 1956, assigned to the same assignee, there is disclosed a method and apparatus for successively discharging (electrical) energy by electrical arc into an enclosure immediately behind a moving projectile or behind a traveling shock wave in such a controllable manner and in such sequence that the projectile or shock wave is driven down the length of the enclosure at a uniformly high acceleration and progressively increases speed at a greater rate than could previously be obtained by known guns or shock wave generating devices. More specifically in this arrangement, a series of spaced electrical arc discharges are initiated in sequence down the length of an enclosure behind the moving mass which serve to greatly heat and expand the gases initially within the enclosure to perform the work of propagating the mass. However, not all of the electrical energy generated by the arc discharges is converted into heating and pressurizing the gas since some of this energy is lost, absorbed, or dissipated by the surrounding walls of the enclosure.

In accordance with the present invention, there is provided a means for utilizing some of this lost energy by employing an enclosure wall structure that releases great quantities of gas when subjected to the heating of an electric arc and rapidly releasing great quantities of light gases. By this release of great quantities of additional gases within the enclosure and behind the mass to be propelled, the pressure of the propelling gases is further increased serving to propagate the mass at greater accelerations than in the prior method and apparatus.

It is accordingly one object of the present invention to provide an apparatus for efficiently converting electrical energy into a form usable to propel a shock wave or a projectile down the length of an enclosure at great speed.

Other objects and many attendant advantages of this invention will be more readily comprehended to those skilled in this art upon a detailed consideration of the following specification taken with the accompanying drawing illustrating in a side elevational view, partially in section, one preferred embodiment of the present invention.

Referring now to the figure for a detailed consideration of one preferred apparatus in accordance with the present invention, there is shown, an elongate hollow tubular member, generally designated 10, that is sealed at the left-hand portion thereof and open ended at the right and preferably comprised of an inner tubular member 11 fastened within an outer tubular member 12, both of which are formed of electrically non-conducting material. A series of spaced conducting electrodes 13–16, inclusive, electrically insulated from one another by this member 10, are fixedly distributed along the length of this tubular member and an additional starter electrode 16 is positioned to seal the left-hand portion of the member 10, as shown. Energizing each adjoining pair of these electrodes 13–16, inclusive, is a separate high voltage source of electrical energy 17–19, inclusive, with each source having its terminals energizing adjacent electrodes through an inductor 20 or other suitable electrical network for controlling the time constant of any electrical arc that may discharge through that electrode.

The starting voltage source 17 energizing the end electrode 16 and the first electrode 13 through a normally open switch 21, is of a large enough voltage to initiate an arc discharge through the gas, such as air, within the tube when this switch is closed. However, the potentials across the remaining electrodes 13–15, inclusive, are not sufficiently large for generating arcs through the gas within the tube.

Within the tube 10 is positioned a suitably formed projectile 22 that is adapted to be propelled at great speed in a manner to be hereinafter described.

Now, as referred to in the above-mentioned copending application, to initiate operation, switch 21 is closed connecting electrical source 17 across end electrode 16 and first electrode 13. This high voltage generates an arc within the tube across these electrodes; imparting or "dumping" great heat and electrical energy into the tube and greatly pressurizing the gases within the tube 10. Concurrently, the electrical energy and the rapid heating of the vapor causes this gas to ionize. However, in the apparatus of said copending application, some of the energy of this electrical arc discharge is lost to the walls of the tube 10, and hence, not converted into usable form for propagating the projectile 22.

In accordance with the present invention, the supporting tubular member 12 is preferably lined with the inner tubular member 11 that is formed of a material that releases large quantities of gas when subjected to the heat caused by an electric arc. During this arcing, therefore, the gas pressure inside of the inner tube liner 11 rises to extremely high values, resulting from the evolution and disassociation of gases from the inner line 11 as well as from the great heating and pressurizing of the original gases within the tube from the arc itself.

Many such materials that release great quantities of gases when subjected to the heating action of an electric arc are known and such materials may be clssified under the generic name of electrical arc responsive gas generating materials. Included in this grouping are such materials known in the trades as vulcan fiber, hard fiber, rubberized fiber, butyl rubber, and specially processed paper cellulose. Each of these materials rapidly release great quantities of hydrogen gas when subjected to the heating action of electrical arcs of given intensity, and this gas is released within the tube 10, additionally raising the pressure of the compressed and heated gas initially within the tube as discussed above.

It is preferred to employ a material adapted to generate a lightweight gas such as hydrogen, helium, or neon since less energy is needed to propel these lighter gases at the great speeds and accelerations desired. However, materials generating the heavier gases such as oxygen or nitrogen may be used, if desired, although greater amounts of the available electrical energy released into the enclosure will be expended in propelling these heavier gases. The materials mentioned above are of organic composition suitably vulcanized or otherwise treated for hardness and generally comprised of carbon, hydrogen, and oxygen in the molecular arrangement of $(C_6H_{10}O_5)_n$.

As projectile 22 is propelled down the length of the tube, this ionized gas behind it travels between the first pair of electrodes 13 and 14, lowering the electrical resistance of the gas between these electrodes and enabling a second arc to be generated across these electrodes.

This second arc feeds an additional jolt of electrical energy into the tube at a position spaced from the first electrical discharge which also greatly heats and pressurizes the gas within the tube as well as releasing additional large quantities of gas from the tube liner 11 to further maintain a uniformly high gas pressure behind the projectile.

The time constants of each arc discharge and the electrical energy imparted by the arcs are controlled to maintain the energy level preferably constant as the projectile travels down the length of the tube, thereby continually renewing the energy level in the tube immediately behind the projectile and effectively preventing any decay in this energy level.

Thereafter, as the projectile passes each pair of electrodes, the ionized gas continually moving behind comes in contact with each successive pair of electrodes, lowering the resistance of the gap between these electrodes and permitting the associated voltage source interconnecting these adjoining electrodes to discharge an arc, thereby resulting in a successive series of arcs down the length of the tube immediately following behind the projectile.

Consequently, as the projectile travels down the length of the tube, an automatic series of arc discharges takes place as this projectile passes each of these pairs of electrodes thereby continually imparting jolts of energy into tube 10 in such a manner as to maintain the energy content at a uniformly high predetermined level and resulting in the desired great speed of propagation of this projectile down the tube. As each of these arc discharges occur, the energy normally lost to the walls of the tubular enclosure member is used to release large amounts of gas from the tubular lining 11, thereby more efficiently converting the electrical energy into a form suitable for propelling the projectile.

The time constants of these successive arc discharge paths are preferably so adjusted that the first arc discharge is the longest and each succeeding arc discharge continues to supply current until the work of propelling the mass is completed.

As shown, the enclosure 10 may be formed of the two concentrically fastened hollow tubular members 11 and 12, or formed of a series of similar shorter cylindrical sections, each being comprised of the concentrically connected outer tube and liner and each section being interconnected in sequence with the next section by a conducting ring-like electrodes or the like. The sealing means at the left-hand end of the tube tubular member may be the starting conducting electrode 16 which is suitably joined to the tube to provide a fluid-tight seal. It is evident that the thickness and strength of the complete tube 10 must be so designed as to withstand the extreme internal gas temperatures and pressures for propagating the projectile or the shock wave at the desired speeds.

Thus by means of the present invention, it is observed that there is provided a more efficient means for generating and applying great amounts of energy within a closed container to propel a projectile or propagate a shock wave than could heretofore be obtained by employing conventional techniques. This is accomplished by successively generating energy in a spaced manner along the length of an enclosure as is disclosed and claimed in said above mentioned application and additionally forming the walls of a material that responds to this generation of energy in such a manner as to increase the energy level performing the useful work.

Although the preferred apparatus discussed above is illustrated in connection with the firing of a projectile down the enclosure, this apparatus is equally well suited to the propagation of a traveling shock wave as is more fully disclosed in the above mentioned copending application.

It is believed well known to those skilled in the art that electrical arc discharges provide a much more effective propagating force than do the usual chemical chemically generated reactions, since greater temperatures, more uniform heating, and greater control of the release of energy can be obtained within the tube than can be obtained with these usual chemical reactions. It is further evident to those skilled in the art that this means for generating and applying great usable energy can be obtained automatically or in a self-triggering manner that is quite simple and inexpensive since the propagated element or shock wave, itself, triggers the switching of the various energy generating means to impart energy to the tube in a desired sequence thereby requiring no additional switching or timing mechanism. Additionally, if desired, more elaborate external circuitry may be employed to trigger the arc discharges in a different sequence or provide greater control of the time constants.

Although but one preferred method and apparatus have been disclosed and illustrated as required by the patent laws, it is believed evident to those skilled in the art that many changes may be made in the structure and arrangement of the enclosure, electrodes, voltage sources and other of the preferred details shown and described above without departing from the spirit and scope of this invention. For example, it is evident that rather than employing a lining material 11 to release gas in response to the electrical arc discharges, it may be preferred to use a single member or series of sections comprised solely of the desired gas generating material.

Additionally, many variations may be made in the electrode arrangement and structure as well as in the means for generating the starting or first arc discharge. Since these and other changes will be apparent to those skilled in the art, this invention is to be considered as being limited only in accordance with the following claims appended hereto:

What is claimed is:

1. In an apparatus for propelling a mass at extremely high speed, an elongate hollow enclosure member containing a gaseous material and having one end thereof sealed and the other open, said enclosure member including an electrical arc responsive material adapted to release gases when subjected to the heating of an electrical arc discharge, and means for progressively generating a series of electrical arcs down the length of said enclosure to propagate said mass, each said arc discharge greatly heating and pressurizing the gaseous material within the enclosure and additionally reacting with said arc responsive material to release great quantities of said gas adding to the pressure within the member.

2. In the apparatus of claim 1, said material being formed as a liner inside of said hollow member.

3. In the apparatus of claim 1, said member being composed of said material.

4. In an apparatus for propelling a mass at extremely high speed, an elongate hollow enclosure member containing a gaseous material and having one end thereof sealed and the other open, said enclosure member including an electrical arc responsive hydrogen releasing composition, and means for progressively generating a series of electrical arcs down the length of said enclosure member and within said member to propagate said mass, each said arc discharge greatly heating and pressurizing the gaseous material within the enclosure and additionally reacting with said hydrogen releasing composition to generate gases adding to the pressure therein.

5. In an apparatus for generating energy to propel a mass down the length of an elongate container housing air, an elongate nonconducting container having one end thereof sealed and the other end opened, said container including a material responsive to the heating action of an electrical arc to release great quantities of lightweight gas, a series of conducting electrodes positioned in a spaced manner within said container, means for applying potentials to said electrodes to produce spaced electrical fields within said container, and means for generating an energy discharge in the vicinity of the container to greatly heat, expand, and ionize the air and set this air in motion down the length of the container and additionally to release great quantities of lightweight gas from said material in response to the heat of said energy discharge, whereby as said ionized air passes each pair of said electrodes, it initiates an electrical arm discharge thereacross releasing great quantities of lightweight gas from said material.

6. In an apparatus for sequentially generating energy to propel a mass, an elongate non-conducting hollow tubular member having one end thereof sealed and the other end opened to air, said member including a material responsive to the heating action of electrical arc discharges to release great quantities of lightweight gases, a series of conducting electrodes positioned within said member and spaced along the length of said member, means for applying voltage potentials across each adjoining pair of electrodes to produce spaced electrical fields within said member of insufficient magnitude to generate arc discharges therebetween, and means for producing a first electrical arc discharge within said member and in the vicinity of the sealed end thereof to greatly heat and ionize the air and set this ionized air in motion down the length of the member and additionally to release great quantities of lightweight gases from said material, whereby as said ionized air passes each of said spaced electrical fields, it lowers the electrical resistance of the gas between said electrodes and triggers the generation of an electric arc therebetween while additionally pressurizing the gas by the release of great quantities of lightweight gases from said material, thereby enabling the generation of a sequential series of electrical arcs down the length of the member maintaining the energy behind the traveling ionized gas at a uniformly high level.

7. In an apparatus for sequentially generating energy to propel a mass, an elongate non-conducting tubular member having one end thereof sealed and the other end open to air, a series of conducting rings within said member and spaced from one another, said member including a hydrogen releasing organic composition responsive to the heating action of electrical arc discharges to release great quantities of hydrogen gases within the member, means for applying voltage potentials to energize each adjoining pair of rings, thereby to produce a series of spaced electrical fields within said member, and means for ionizing the air within said member in the vicinity of the sealed end thereof and directing said ionized air down the length of the member, whereby as said ionized air traverses each pair of said spaced rings, it triggers an electrical arc discharge thereacross, enabling the generation of a successive series of electrical arc discharges down the length of said member and enabling each electrical arc discharge to release great quantities of lightweight gases from said material considerably adding to the pressure of the gases within said member.

8. In the apparatus of claim 7, said composition being formed as a lining within said tubular member.

No references cited.